United States Patent Office 3,099,896
Patented Aug. 6, 1963

3,099,896
SOIL TREATING COMPOSITION AND METHOD
Herbert Kurth, Oberursel, Taunus, Germany, assignor of one-half to Robert E. Burns, New York, N.Y.
No Drawing. Filed May 9, 1961, Ser. No. 108,734
5 Claims. (Cl. 47—1)

This invention relates to soil conditioning and treatment and is more particularly concerned with means and methods of improving the arability of soils, especially sandy soils.

In prior efforts to improve the arability of poor soils, such as sandy soils, various types of support layers or beds have been proposed. In this connection, prior proposals have related to the use of moss, peat, and like natural products, as well as synthetic compositions such as urea-formaldehyde resins, foamed resinous materials, melamine resins, and the like, sometimes in admixture, and generally in the form of plates or aggregates.

All of these materials, however, aside from being in themselves relatively expensive, have also had to be supplemented by nutrient salts or fertilizing compositions in order to bring about the desired growth of plants. In addition, the support layers provided by these compositions have had to be kept in a constantly moist condition. This last-mentioned consideration, in particular, has restricted the use of such materials, and has rendered them generally unsuitable for use in large areas, such as large waste regions. In such regions, the total cost of using the previously-proposed compositions would be prohibitive.

It is, accordingly, an object of the present invention to provide a support or foundation layer or bed for improving the arability of soils which avoids the drawbacks and disadvantages of support layers heretofore proposed.

In accordance with the invention, there is provided a support layer for use in soils which is the condensation product of an alginate, pentaerythritol, sorbitol, and formaldehyde. This condensate is incorporated in the soil to form a support layer having a depth of the order of 5 to 12 centimeters.

The alginate-pentaerythritol-sorbitol-formaldehyde condensate is formed from materials which are relatively inexpensive compared with materials heretofore used or proposed for this purpose, and it has a gelatinous nature and can store large quantities of water. For example, each 40 grams of the condensate will hold approximately 5 liters of water. In addition, the support layer formed from the above-described condensate contains substantially all of the factors required for plant growth, at least to the blossoming or fruition period, so that the addition of synthetic or natural nutrient salts, synthetic fertilizers, and the like, is unnecessary under ordinary circumstances.

Advantageously, the gelatinous condensate is mixed with bulk filler materials in order even further to increase its water-binding capacity and in order to increase the surfaces among which the root system can secure a satisfactory hold, as well as to insure a good capillary formation. Typical bulk filler materials include glass wool, mineral wool, or other inorganic fibers, or organic fibrous substances, such as pulped paper, and synthetic foam materials, such as synthetic urea foams, and the like.

In a typical installation, the support layer of the above-described condensate, with or without admixture with bulk filler materials, is advantageously covered with soil to a depth of 3 to 12 centimeters, although a greater depth, e.g. up to 25 centimeters may be utilized. This effectively retards evaporation of the stored moisture and, at the same time, provides a bed which, like the soil lying under the support layer, become gradually humidified by the developing root system and other plant parts. For best results, the support layer has a depth of 10 to 12 centimeters, and the overlying soil, e.g. sand, similarly has a depth of 10 to 12 centimeters.

The invention will be further understood by reference to the following specific example of practical application.

In a glass vessel were placed a layer of sand of a depth of 5–6 centimeters, then a layer of 5–6 centimeters depth of alginate-pentaerythritol-sorbitol-formaldehyde condensate, followed by a second layer of sand of about 3–4 centimeters depth, upon which seeds were scattered, and the seeds were then covered with a final layer of sand of 1 centimeter depth. After a short time, the seeds began to germinate, and they developed into healthy plants with a very ramified root system. It was not necessary to supply nutrient solutions or fertilizers during the germinating period. However, fertilizers of conventional type are advantageously added at later periods, e.g. the blossoming or fruition period, for best results.

When treating large expanses of land in accordance with the present invention, the condensate is suitably applied to the soil in any convenient manner. For example, it may be sprayed upon the soil from large tank trucks, or it may be distributed manually. Before application of the condensate, the top layer of the soil to be treated is removed to a depth of 10 to 25 centimeters, and this top layer is subsequently replaced, in whole or in part, to cover the condensate support layer.

As a general rule, the quantity of condensate applied is 500 to 1000 grams per square meter of soil to be treated. When a bulk filler is employed, the filler is used in the amount of 20 to 50 parts by weight per 100 parts of condensate.

The alginate-pentaerythritol-sorbitol-formaldehyde condensation product is suitably prepared by combining substantially equimolecular quantities of a metal alginate, e.g. sodium alginate, known collectively under the term "algin," pentaerythritol, sorbitol, and formaldehyde, e.g. in the form of a 37% formalin solution. Condensation is effected by heating the mixture, e.g. at 100–105° C., for about 60 minutes, in the presence of about 0.05% of a catalyst, such as nitric acid-ozone. It will be understood, however, that the condensate useful in soil conditioning and treatment in accordance with this invention is not limited to that produced by the above-described process, and condensates of other proportion of the specified four components are fully satisfactory. Thus, for example, the proportion of alginate may vary from 30 to 40%, the proportion of pentaerythritol may vary from 10 to 20%, the proportion of sorbitol may vary from 10 to 20%, and the proportion of formaldehyde may vary from 15 to 20%.

The condensate is suitable for use in growing any plant crop, e.g. vegetables, such as beans, or grains, such as rye, or other vegetation. In the foregoing specific example of plant growth, for instance, the seeds used were those of lupine.

The action of the alginate-pentaerythritol-sorbitol-formaldehyde condensate is not fully understood, but it is believed that there is some conversion in the soil to glucose and some formation of mannitol and fructose, as well as aldohexoses.

It will be further understood that various changes and modifications may be made in the compositions and procedures described above without departing from the invention as defined in the appended claims and it is intended, therefore, that all matter contained in the foregoing description shall be interpreted as illustrative only and not as limitative of the invention.

I claim:

1. A composition suitable for forming a supporting layer in soil to facilitate the growth of plant life therein which comprises an alginate-pentaerythritol-sorbitol-formaldehyde condensate.

2. A composition as defined in claim 1, further comprising a bulk filler.

3. Soil suitable for the growth of plant life therein comprising a layer of an alginate-pentaerythritol-sorbitol-formaldehyde condensate and a superposed layer of soil.

4. The method of conditioning soil for the growth of plant life therein which comprises incorporating in the soil an alginate-pentaerythritol-sorbitol-formaldehyde condensate.

5. The method of conditioning soil for the growth of plant life therein which comprises forming in the soil a supporting layer of an alginate-pentaerythritol-sorbitol-formaldehyde condensate.

References Cited in the file of this patent

UNITED STATES PATENTS

| | | |
|---|---|---|
| 2,351,256 | Fischer | June 13, 1944 |
| 2,570,537 | Finch | Oct. 9, 1951 |
| 2,643,236 | Kropa | June 23, 1953 |
| 2,770,921 | Goodhue | Nov. 20, 1956 |
| 2,785,947 | Kress | Mar. 19, 1957 |
| 2,895,945 | Fischer | July 21, 1959 |
| 3,020,676 | McGillivray | Feb. 13, 1962 |

FOREIGN PATENTS

| | | |
|---|---|---|
| 253,643 | Germany | Nov. 14, 1912 |